May 22, 1928.

C. G. JOHNSON

TAPER THREAD GAUGE

Filed Aug. 23, 1926

1,671,032

INVENTOR.
Charles G. Johnson.
BY
ATTORNEY

Patented May 22, 1928.

1,671,032

UNITED STATES PATENT OFFICE.

CHARLES GUSTAF JOHNSON, OF HARTFORD, CONNECTICUT.

TAPER-THREAD GAUGE.

Application filed August 23, 1926. Serial No. 130,975.

This invention relates to an improved apparatus for gauging taper threads. Gauges and gauging apparatus of various kinds are in common use for gauging straight threads, but, as far as I am aware, the only gauge in use for gauging taper threads, commonly known as pipe threads, is the well known ring gauge. In use this gauge is screwed onto the taper thread to be gauged and the size and accuracy of the thread is determined by observing how nearly flush the end of the threaded piece comes to the face of the gauge when the gauge is fully screwed thereon. This gauge is inefficient and objectionable for various reasons, among which may be mentioned the considerable amount of time required in the gauging operation and the depending entirely upon observation for the gauging accuracy. It is the primary object of my invention to provide an improved apparatus for gauging taper threads which will overcome these objections.

In gauging straight threads, contact with the threads themselves need only be considered, and as above stated, various kinds of gauging apparatus is in common use for this purpose, these apparatus being very quick acting and not depending upon observation for their accuracy.

In gauging taper threads, however, another factor is associated with the thread and must be considered. This factor is the diameter of the threaded piece as measured from the end thereof. This end can therefore be regarded as the "working point" in gauging these threads. My improved apparatus embodies a fixed guide surface for receiving this end of the work piece and guiding the same in the gauging operation, the axial position of the work piece thereby being accurately located relative to the gauging elements without requiring time and observation for such location. One or more pair of taper thread gauging elements are located on the gauge frame at opposite sides of this guide surface and diverge outwardly therefrom in such a manner that the grooved opposing faces thereof cooperate to form a taper thread gauge. It is another object of my invention to provide an improved taper thread gauge embodying such a guide surface for the end of the threaded piece to be gauged.

In gauging straight threads, the work piece can be moved axially to accommodate the relative position of the gauging elements. However, in gauging taper threads, as above outlined, the axial position of the work piece is fixed and, with the gauging elements fixed against movement axially of the work piece, it would be necessary to rotate the work piece sufficiently to bring the threads thereof into alignment with the thread grooves in the gauging elements and such operation would require a considerable amount of time. In my improved gauge, I avoid this requirement by permitting the gauging elements to have a slight movement axially of the work piece, resilient means normally holding the elements centralized. Furthermore, while I preferably use gauging elements of the annular grooved roll type, such as shown in my copending application, Serial No. 404,791, filed August 20, 1920, and renewed October 6, 1925, it will be understood that my invention herein is of broader scope and anticipates the use of any type of gauging element desired. It is a further object of my invention to provide an improved taper thread gauge embodying these novel features.

In the accompanying drawing, I have illustrated one specific embodiment of my invention, but it will be understood that the invention can be otherwise embodied and that the drawing is not to be construed as defining or limiting the scope of the invention, the claims appended hereto being relied upon for that purpose.

Referring to the figures of the drawing.

Figure 1:
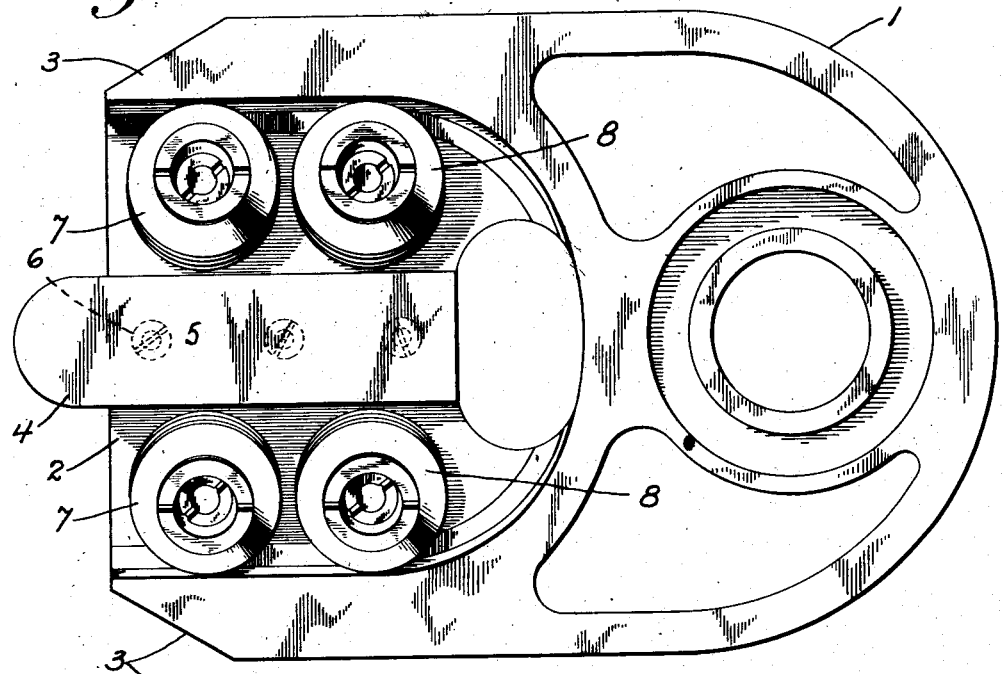
Fig. 1 is a side elevation of a thread gauge embodying my invention.

The accompanying drawing illustrates my invention in the form of a snap gauge, the frame of which is indicated by the reference character 1. This frame is similar to that shown in my above-mentioned application except that a solid web 2 is provided between the gauge ends 3. The guide surface above mentioned is provided on this web, preferably in the form of a separate hardened steel plate 4 having a plane ground guiding face 5 for receiving the end of the work piece. The plate may be held in place by screws 6. The two pairs of gauging elements or anvils 7 and 8 illustrated in the drawing are preferably of the annularly grooved roll type shown in my said copending application. Each of these elements comprising a roll annularly grooved to provide a plurality of thread engaging annuli 9 having the crests thereof formed to fit the screw thread to be tested. Each roll is rotatably mounted on a supporting post 10 having an eccentric portion 11 mounted in the gauge frame. The post is held in the frame by a screw 12 having a nut 13 thereon within a bore 14 in the end of the post. The elements can be adjusted transversely by loosening the nuts 13 and rotating the posts, as will be understood. The posts can be sealed in such position by filling the bore with wax.

The two supporting posts 10 of each pair of gauging elements 7 and 8 are located opposite each other on opposite sides of the guide plate 4 and project outwardly of the gauge frame in relatively diverging directions in such a manner that the grooved opposing faces thereof cooperate to form a taper thread gauge. The annuli 9 are preferable spaced to double the thread pitch whereby the same engages every other thread of the work piece.

As have been stated above, it is desirable to permit the gauging elements to have a slight movement axially of the work piece. As illustrated, I mount each gauging roll for free sliding and rotary movement on its supporting post and normally hold each roll in its centralized position by a pair of springs 15 respectively engaging against the ends of the roll. The amount of play permitted each roll may be such as is found from experience to be the most desirable, this amount necessarily being slightly more than one-half the screw thread pitch in each direction, so that the thread may be placed in the gauge at any point of its circumference without causing the gauging rolls to become cramped. I preferably permit each roll a play equal to the pitch of the screw thread plus twice the diameter of the wire used in the springs 15, plus an additional amount of about .015 inch.

Figure 2:
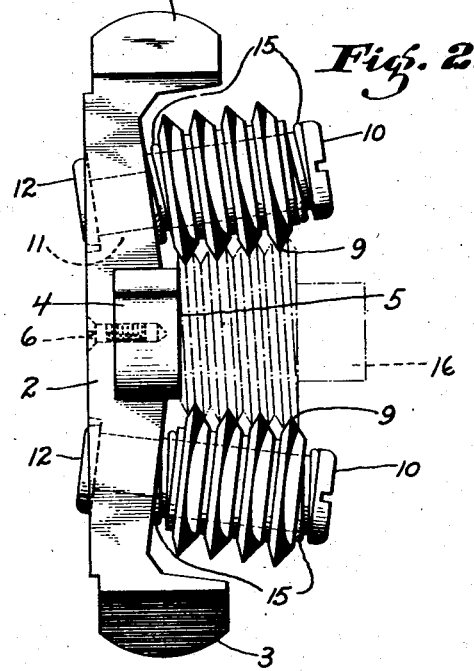
Fig. 2 is an end view thereof.
Figure 3:
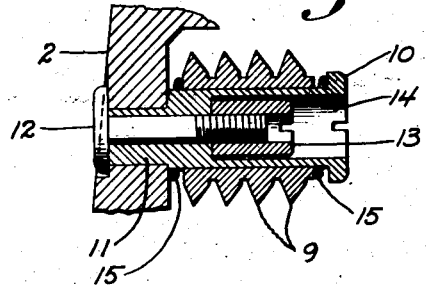
Fig. 3 is a longitudinal sectional view through one of the gauging elements.

The gauge illustrated in the drawing is a snap gauge in which the gauging elements 7 are the "go" pair and the gauging elements 8 are in the "no go" pair. The gauging elements are adjusted to accurate working position as follows: The threaded end of a master plug gauge 16 is placed flat against the guide face 5, as illustrated in Fig. 2, and directly between the pair of gauging elements 7. These elements are then adjusted to contact therewith. The gauging elements 8 are set in like manner except that a thickness gauge or plate is placed between the plug gauge end and the surface 5 which will hold the end of the plug gauge a spaced distance away from the guide surface. The elements 8 will thereby be set somewhat closer together than the elements 7.

The use and advantages of my invention are believed to be obvious. The threaded end of the work to be gauged is placed against the guide face 5, at the outer end thereof, and is moved between the gauging elements while holding the work piece in contact with the guide face. In this operation, the work piece is held in the same position as the gauge plug 16 in Fig. 2. The slight axial play permitted the gauging rolls allows the same to move sufficiently to engage the work threads. As in other snap gauges, the work is acceptable if it passes between the "go" elements 7 but will not pass between the "no go" elements 8. The elimination of the necessity of gauging taper threads by observation and the time saved by the use of my invention, as well as the other novel attending features thereof, are all believed to be obvious from the disclosures herein.

Having thus described my invention, what I claim and desire to secure by Letters Patent is:

1. A taper thread snap gauge comprising the combination of a frame, means providing a work guiding surface thereon, and a pair of grooved thread gauging anvils mounted on the frame respectively on opposite sides of the work guiding surface and projecting outwardly from the frame in relatively diverging directions in such manner that the grooved opposing faces thereof cooperate with the work guiding surface and each other to form a trigonal contact for gauging a taper threaded piece, the arrangement being such that when the threaded end of the threaded piece is in contact with the work guiding surface the grooved faces of the two anvils engage the threads on opposite sides of the piece.

2. A taper thread snap gauge comprising the combination of a frame, two pairs of annularly grooved thread-gauging rolls mounted thereon in spaced relation, the two rolls of each pair being located opposite each other and projecting outwardly of the frame in relatively diverging directions in such a manner that the grooved opposing faces thereof co-operate to form a taper thread gauge, one pair of rolls being the "go" pair and the other pair being closer together and constituting the "no go" pair, and means for adjusting certain of the rolls transversely.

3. A taper thread snap gauge comprising the combination of a frame, two pairs of annularly grooved thread-gauging rolls mounted thereon in spaced relation, the two rolls of each pair being located opposite each other and projecting outwardly of the frame in relatively diverging directions in such a manner that the grooved opposing faces thereof co-operate to form a taper thread gauge, one pair of rolls being the "go" pair and the other pair being closer together and constituting the "no go" pair, means for adjusting certain of the rolls transversely, and resilient means normally holding the rolls against axial movement but permitting a slight axial movement thereof to accommodate the position of the thread to be gauged.

4. A taper thread snap gauge comprising the combination of a frame, means providing a work guiding surface thereon, and two pairs of grooved thread gauging anvils mounted on the frame in spaced relation, the two anvils of each pair being located opposite each other on opposite sides of the work guiding surface and projecting outwardly in relatively diverging directions in such a manner that the grooved opposing faces thereof co-operate to form a taper thread gauge, one pair of anvils being the "go" pair and the other pair being closer together and constituting the "no go" pair.

5. A taper thread snap gauge comprising the combination of a frame, means providing a work guiding surface thereon, two pairs of annularly grooved thread-gauging rolls mounted on the frame in spaced relation, the two rolls of each pair being located opposite each other on opposite sides of the work guiding surface and projecting outwardly in relatively diverging directions in such a manner that the grooved opposing faces thereof co-operate to form a taper thread gauge, one pair of rolls being the "go" pair and the other pair being closer together and constituting the "no go" pair, and means for adjusting certain of the rolls transversely.

6. A taper thread snap gauge comprising the combination of a frame, means providing a work guiding surface thereon, two pairs of annularly grooved thread-gauging rolls mounted on the frame in spaced relation, the two rolls of each pair being located opposite each other on opposite sides of the work guiding surface and projecting outwardly in relatively diverging directions in such a manner that the grooved opposing faces thereof co-operate to form a taper thread gauge, one pair of rolls being the "go" pair and the other pair being closer together and constituting the "no go" pair, and resilient means for normally holding the rolls against axial movement but permitting a slight axial movement thereof to accommodate the position of the thread to be gauged.

CHARLES GUSTAF JOHNSON.